March 3, 1953  S. M. BENNETT  2,629,879
TOILET FLUSH TANK FLOAT VALVE
Filed April 5, 1950
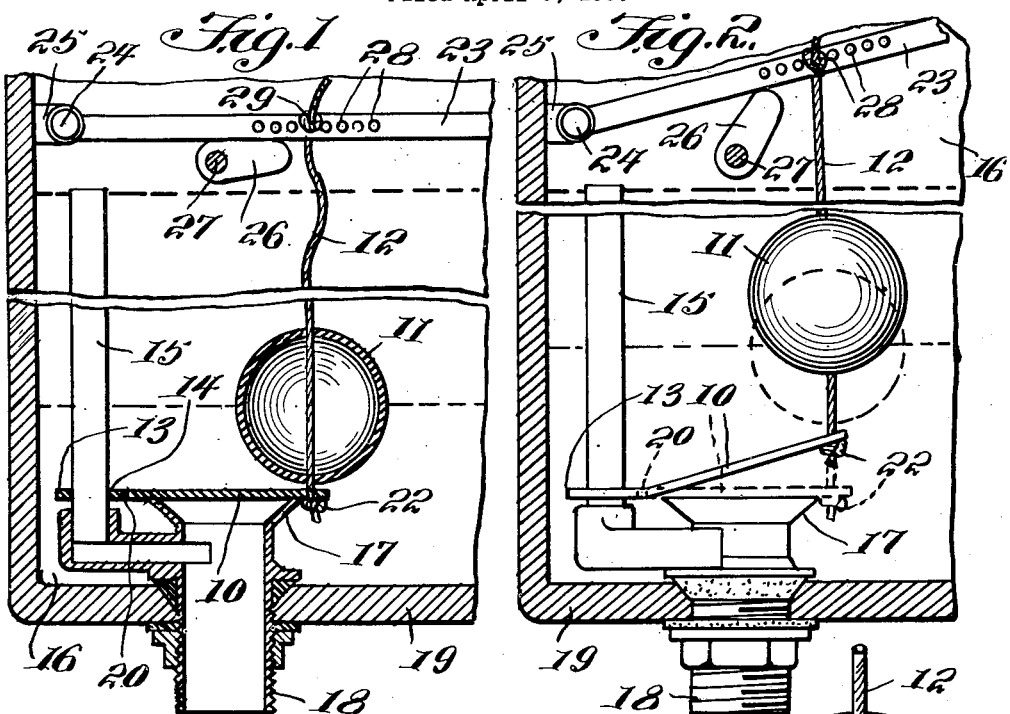
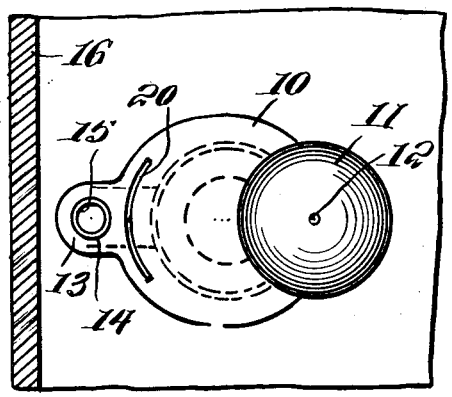
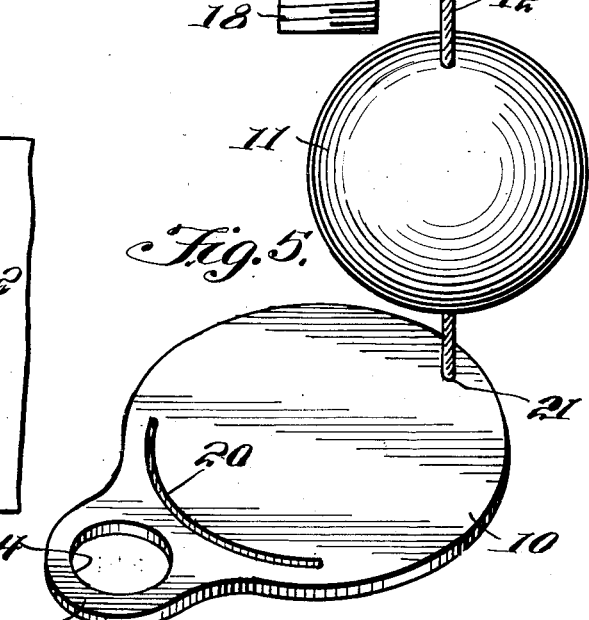
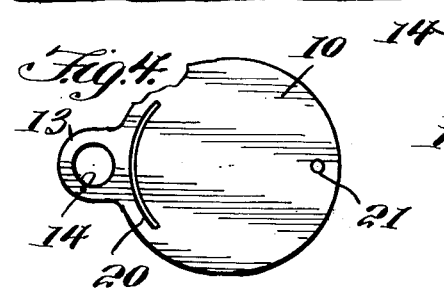
INVENTOR.
Samuel M. Bennett,
BY Victor J. Evans & Co.
ATTORNEYS Patented Mar. 3, 1953

2,629,879

UNITED STATES PATENT OFFICE 2,629,879

TOILET FLUSH TANK FLOAT VALVE

Samuel M. Bennett, Brighton, Colo.

Application April 5, 1950, Serial No. 154,144

3 Claims. (Cl. 4—57)

This invention relates to trip actuated float valves for flush tanks of toilets and the like, and in particular a valve in the form of a rubber disc positioned over the outlet pipe of a flush tank with the disc connected to the trip lever of the tank by a cord and with a ball forming a float adjustably mounted on the cord whereby the rubber disc is raised as the trip lever is actuated and the float or ball controls the closing action thereof.

The purpose of this invention is to provide a float valve for flush tanks of toilet bowls that is positively actuated and that is positively seated over the outlet pipe of the tank.

Numerous types of float actuated flush valves have been provided for flush tanks of toilets but owing to the inexpensive instrumentalities used in valves of this type very few valves in toilet flush tanks operate efficiently. With this thought in mind this invention contemplates a rubber disc positioned over the end of an outlet pipe of a flush tank with the disc positioned to positively close the pipe when it is released by the trip lever and also wherein the disc is positively opened by the trip lever.

The object of this invention is, therefore, to provide means for constructing a trip valve for flush tanks of toilets and the like wherein the valve is positively actuated to open and close.

Another object of the invention is to provide a positive actuated outlet valve for flush tanks that may be used in flush tanks now in use.

A further object of the invention is to provide an improved float valve for flush tanks of toilets and the like which is of a simple and economical construction.

With these and other objects and advantages in view the invention embodies a rubber disc mounted on the overflow pipe in a toilet flush tank and positioned to cover the outlet pipe of the tank and a cord with a float thereon for connecting the disc to a trip lever on the tank.

Other features and advantages of the invention will appear from the following description taken in connection with the drawings wherein:

Figure 1 is a cross section through the lower corner of a flush tank illustrating the relative positions of the parts.

Figure 2 is a similar view showing the valve in the open position and wherein the valve and associated parts are shown in elevation.

Figure 3 is a plan view of the valve with part of the tank shown in section and part broken away.

Figure 4 is a plan view of the valve disc with other parts omitted.

Figure 5 is a detail illustrating the combination of the float, cord and valve disc.

Referring now to the drawings wherein like reference characters denote corresponding parts the improved float actuated flush tank valve of this invention includes a rubber disc 10, a ball 11 providing a float, and a cord 12.

The valve disc 10 which is preferably formed of rubber or other suitable resilient material is provided with an extension 13 having an opening 14 therein that is positioned over an overflow tube 15 of a flush tank 16, whereby the valve disc is permanently positioned to rest upon an outwardly flared section 17 at the upper end of an outlet pipe 18 mounted in the base 19 of the flush tank. The opening 14 is positioned in relation to the disc 10 whereby the disc is definitely positioned over the upper end of the outlet pipe with the opening 14 on the overflow tube. By this means the valve disc is retained in position whereby it will operate continuously.

In order to facilitate bending of the valve disc 10 an elongated slot 20 is provided in the portion of the valve disc between the disc and extension 13.

The valve disc 10 is also provided with an opening 21 through which the cord 12 extends and with a knot 22 on the lower end of the cord the cord is retained in the opening 21 of the valve disc.

The upper end of the cord 12 is attached to the trip lever 23 which is pivotally mounted on a pin 24 of a bearing 25 in the tank and the trip lever is actuated by an arm 26 which is carried by a shaft 27 on the outer end of which the usual flushing lever is positioned.

The trip lever 23 is provided with a plurality of spaced openings 28 and the upper end of the cord 12 is positioned in one of these openings with a knot 29 securing the end of the cord in the lever.

The float 11 is in the form of a rubber or cork ball and the ball is frictionally mounted on the cord 12 whereby with the ball positioned at the lower end of the cord as shown in Figure 1 substantially all of the water will drain from the tank as it is flushed, whereas with the ball moved upwardly on the cord, as illustrated in Figure 2 a greater amount of water will remain in the tank. By this means the flushing valve may be adjusted whereby only a quantity of water desired may be used in flushing the tank.

With the parts arranged in this manner the extension 13 of the valve disc 10 is positioned over the overflow tube 15 whereby the valve disc is positioned on the outwardly flared upper end 17 of the outlet pipe 18 and with the cord attached to the disc 12 and trip lever 23 the valve disc will be raised as the trip lever 23 is raised by the arm 26, as illustrated in Figure 2. The float 11 retains the valve disc 10 upwardly until the water level drops sufficiently to permit the valve disc to be lowered by the float. When the valve disc is closed it is secured in this position by the weight of the water until it is manually raised through the trip lever 23 and cord 12.

It will be understood that modifications may be made in the design and arrangement of the parts without departing from the spirit of the invention.

What is claimed is:

1. In a flush tank valve, the combination which comprises a flush tank having an outlet pipe in the lower end with an overflow tube extended upwardly therefrom, a trip lever pivotally mounted in the tank, a resilient valve disc having an extension with an opening therein on one side positioned over the outlet pipe with the opening of the extension positioned over the overflow tube, a cord connecting the edge of the valve disc opposite to that from which the extension extends to the trip lever, and a float adjustably mounted on said cord.

2. In a flush tank valve, the combination which comprises a flush tank having an outlet pipe in the lower end with an overflow tube extended upwardly therefrom, a trip lever pivotally mounted in the tank, a resilient valve disc having an extension with an opening therein on one side positioned over the outlet pipe with the opening of the extension positioned over the overflow tube, a cord connecting the edge of the valve disc opposite to that from which the extension extends to the trip lever, and a hollow rubber ball providing a float mounted on said cord and frictionally held in adjusted positions thereon.

3. A flush tank valve comprising a rubber sheet having an extension with an opening therein at one side, said rubber sheet formed for use on the upper end of a vertically disposed pipe with the opening in the extension at the side positioned over an overflow pipe extended from one side of said vertically disposed pipe to provide anchoring means to retain the rubber sheet in position upon said vertically disposed pipe, said rubber sheet having an arcuate slot in the part thereof from which the extension extends, a cord extended from the side of the rubber sheet opposite to that on which the extension is positioned, and a float positioned to coact with the cord for elevating the side of the rubber sheet from which the cord extends.

SAMUEL M. BENNETT.

REFERENCES CITED

The following references are of record in the file of this patent:

UNITED STATES PATENTS

| Number | Name | Date |
| --- | --- | --- |
| 909,789 | Hawks | Jan. 12, 1909 |
| 1,223,534 | Toman | Apr. 24, 1917 |
| 1,918,597 | Griffiths | July 18, 1933 |
| 1,925,748 | Colvin | Sept. 5, 1933 |